United States Patent [19]

Metzler et al.

[11] Patent Number: 5,228,495
[45] Date of Patent: Jul. 20, 1993

[54] PROCESS FOR THE MANUFACTURE OF BRAKE DISCS

[75] Inventors: Horst Metzler; Guenther Schwarz, both of Tuttlingen, Fed. Rep. of Germany

[73] Assignee: Schwaebische Huettenwerke GmbH, Fed. Rep. of Germany

[21] Appl. No.: 572,707

[22] Filed: Aug. 23, 1990

[30] Foreign Application Priority Data

Aug. 25, 1989 [DE] Fed. Rep. of Germany ....... 3928111

[51] Int. Cl.$^5$ ............................................. B22D 23/02
[52] U.S. Cl. .................................... 164/129; 164/362; 164/DIG. 14
[58] Field of Search ............... 164/129, 131, 350, 361, 164/362, DIG. 14

[56] References Cited

U.S. PATENT DOCUMENTS

| Re. 29,704 | 7/1978 | Bradshaw | 164/131 |
| 1,762,598 | 6/1930 | Teetor | 29/527.9 |
| 2,991,520 | 7/1961 | Dalton | 164/131 |
| 3,559,775 | 2/1971 | Miller | 188/218 X L |
| 3,656,539 | 4/1972 | Zickefoose | 164/129 |
| 3,786,857 | 1/1974 | Sutherland | 164/129 |
| 5,004,078 | 4/1991 | Oono | 188/218 X L |

FOREIGN PATENT DOCUMENTS

| 231507 | 1/1986 | Fed. Rep. of Germany | 164/129 |
| 58-93554 | 6/1983 | Japan | 164/129 |
| 60-18269 | 1/1985 | Japan | 164/131 |
| 16 | of 1873 | United Kingdom | 164/350 |
| 2172676 | 9/1986 | United Kingdom | 188/218 X L |

Primary Examiner—Mark Rosenbaum
Assistant Examiner—Rex E. Pelto
Attorney, Agent, or Firm—Davis, Bujold & Streck

[57] ABSTRACT

In a process for the manufacture of brake discs, in particular of ventilated brake discs, a top runner is formed in a top box (cope), from which the brake disc is cast approximately centrally. The molten metal is uniformly distributed using star-shaped riser ribs.

7 Claims, 2 Drawing Sheets

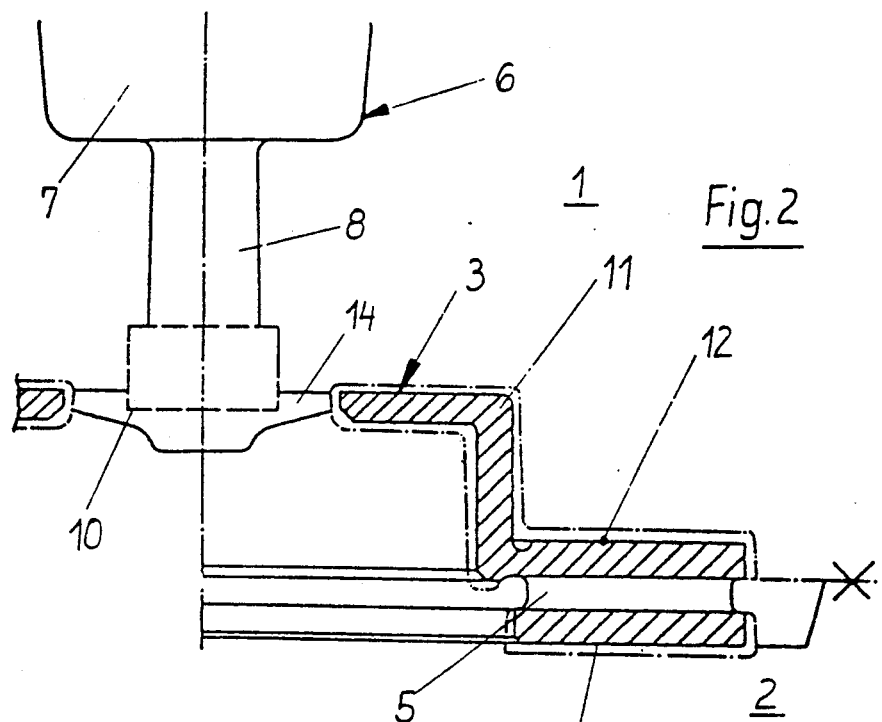
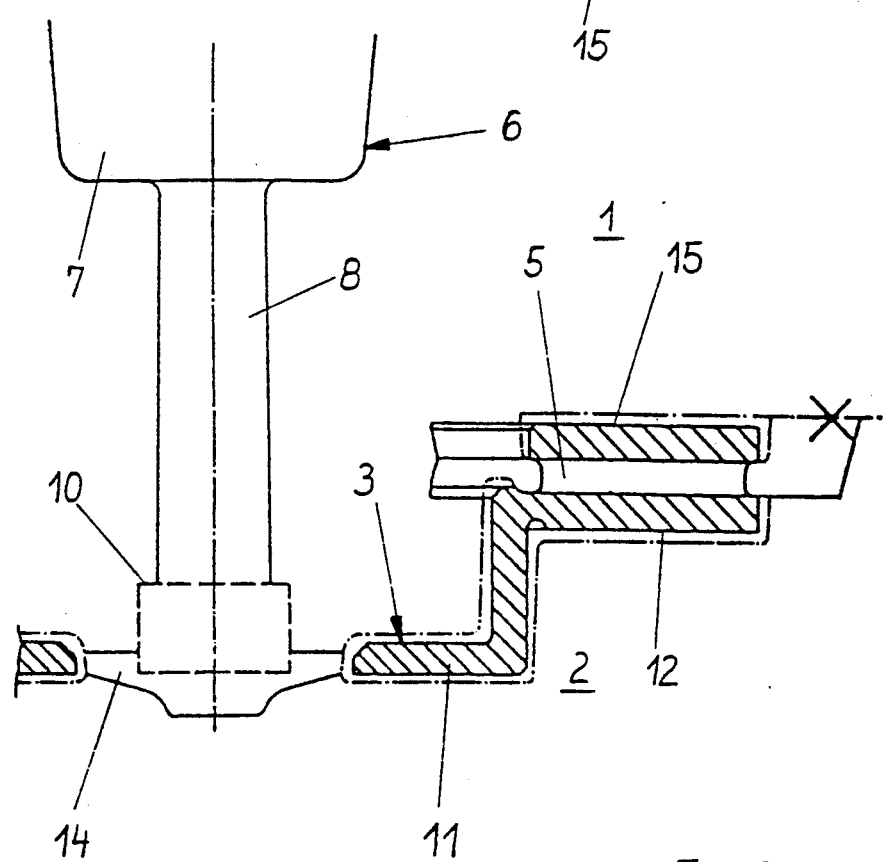

PROCESS FOR THE MANUFACTURE OF BRAKE DISCS

TECHNICAL FIELD

The invention relates to a process for the manufacture of brake discs, in particular of ventilated brake discs, by casting in a sand mold and a thereafter manufactured brake disc.

BACKGROUND OF THE INVENTION

The manufacture of brake discs from, for example, flake graphite cast iron takes place generally according to the sand casting process. In a well-known manufacturing process the brake discs are cast rising vertically in a system, i.e. in an upright standing position. The system is very fast and therefore efficient. It has, however, been found that major differences in structure and hardness occur in the brake discs during this casting process, which lead to considerable deficiencies in quality on brake discs.

The same applies to a likewise well-known manufacture of brake discs using the horizontal casting method. For this, generally box-less systems are used, with the sand being pressed through a frame and subsequently the frame again being ejected or withdrawn. Prior to casting, so-called loading irons are placed on the mold, which is why gating and casting must be carried out one-sidedly from one side via feeding gates. Depending on the type of brake discs, there is a plurality of gates with the risk of tendency toward shrinkholes or blowholes or a circular runner is used.

One of the problems with this process consists in that the fluid iron runs at points into the disc mold. This gives rise to local heating-up at the points in the area of the inlet and a correspondingly slower and uneven or irregular cooling-down. This means that the brake disc is stressed thermally on one side, causing considerable differences in the hardness of the material due to the differing cooling rates. Also of disadvantage is that in ventilated brake discs, i.e. brake discs provided with cooling channels, irregularities occur in the cooling channels. This results in an unbalance of the disc.

Due to the occurring differences in hardness, the parallelism of the two disc surfaces, i.e. the friction rings, also suffers. In practice, hardness differences of up to 20 Brinell hardness points have been found. During machining of the brake disc, these hardness differences lead to turning errors, particularly during turning. For example, during turning with a toolholder which always works at the same loading pressure, dents occur in the surface at the soft or spongy spots.

SUMMARY OF THE INVENTION

The object of the present invention is to create a process for the manufacture of brake discs by means of which a brake disc with higher quality, especially with a more uniform hardness distribution and higher accuracy, can be created.

According to the invention this problem is solved in that a top runner is formed into a top box (cope), from which top runner the brake disc is cast at least approximately centrally.

According to the invention the disc or in the case of the casting of a plurality of discs in a molding box, each disc is now cast individually per se centrally via the top runner molded directly in the top box (cope). Suitable for this is, for example, the hub or the central bore of the disc from which pouring can be carried out uniformly, by which the iron flowing in is uniformly distributed. For this purpose it is solely necessary to provide riser ribs (distribution members) in the center bore of the brake disc, from which the molten iron is further transported uniformly in, for example, a star shape to the hub of the brake disc to be cast.

Surprisingly, it has been found that due to uniform feeding with molten iron, the hardness difference of the material lies at maximum approx. 4 Brinell hardness points. Also the loading of the air-supply core for the brake disc or the cooling channels, which until now had been at points and thus had led to core cracks, is absolutely uniform. This has a very positive effect on the evenness of the cooling channel, by which, in contrast to the state of the art, virtually no wobble of the brake disc occurs.

Also of advantage is that, with regard to parallelism of the two surfaces of the brake disc, i.e. of the friction rings, of the radial wobble and of the unbalance, close tolerances can be maintained without difficulties. For example, parallelism tolerances of the friction rings of 0.0030–0.0050 mm can be maintained.

It goes without saying that a central pouring of cast components is already known form other fields, but for the manufacture of brake discs this method has not been applied, particularly due to the high quantities, i.e. series manufacture, but rather work is carried out with box-less systems.

The inventors have, however, surprisingly found that with the use of molding boxes with one top box (cope) and one bottom box (drag), which are, as the case may be, interlockable, and through a forming of the top runner directly into the top box (cope), the advantages thereby obtained predominate.

In an embodiment according to the invention provision can be made for the brake disc to be molded in the top box (cope) at least approximately predominantly, especially the hub. In the process the brake disc or, in the case of a pouring of a plurality of brake discs, the brake discs can be cast falling in the top box (cope).

It goes without saying, however, that a converse procedure is also possible within the framework of the invention. For example, the brake disc can be molded in the bottom box (drag) at least approximately predominantly, especially with its hub, and casting can be carried out rising from the bottom box (drag).

DETAILED DESCRIPTION OF THE INVENTION

Figure 1:
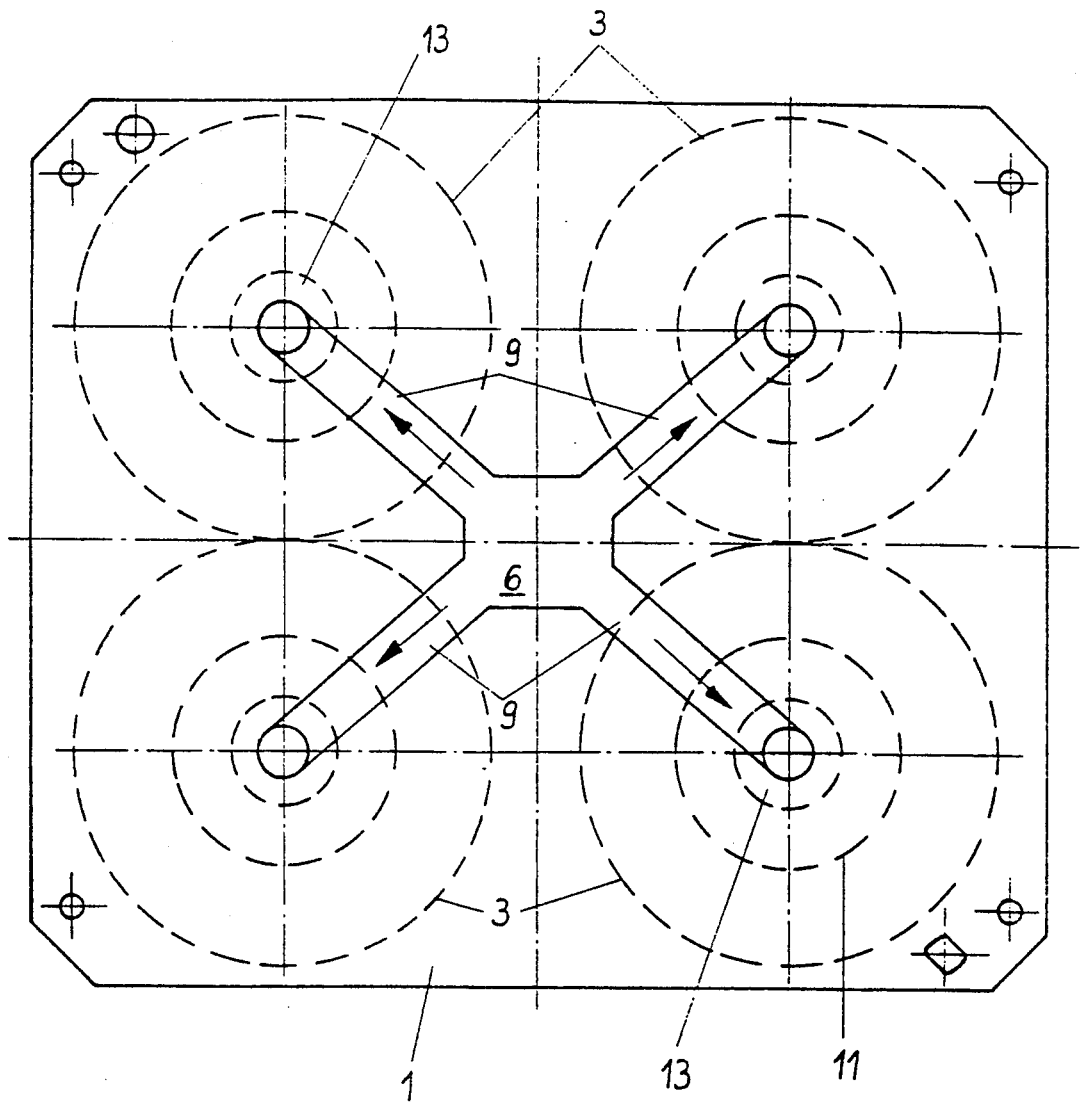

This is shown by the following figures:

FIG. 1: A plan view of the top box (cope) of the molding box;

FIG. 2: A vertical section through the molding box with a top center feed;

FIG. 3: A vertical section through the molding box with a bottom center feed.

The casting process for the manufacture of brake discs is generally known, which is why it will not be dealt with in further detail in the following.

In a molding box, which consists of a top box (cope) 1 and a bottom box (drag) 2, which can be interlocked, four molds 3 for ventilated brake discs are formed in the sand mold (see FIG. 1). For the cooling channel(s), suitable cores 5 are provided. In the manufacture of solid brake discs the cores are of course omitted.

The molding box is normally equipped with a multiple die punch and the sand is compacted via a press plate and a vibrator, with a space being kept free for a top runner 6. The top runner exhibits in general a fairly large inlet funnel 7 and a connecting pouring channel 8 which divided into a suitable number of branch channels 9 during a casting of a plurality of brake discs in a molding box. If desired, in each case pouring filters 10 can be provided at the end of the branch channels 9 (see broken-line representation in FIGS. 2 and 3.).

As can be seen from the figures, the branch channels 9 each terminate in the central area of a brake disc, i.e. in its central bore 13, from where the molten iron can spread uniformly outwards through star-shaped riser ribs 14. The pouring ribs 14 are, like the other casting components, later separated from the brake disc in the usual way.

In the embodiment according to FIG. 2, the brake disc to be cast is virtually nearly completely molded in the top box (cope) 1. This concerns in particular the hub 11 of the brake disc and a friction ring 12. The joint between the top box (cope) 1 and the bottom box (drag) 2 is shown by the chain line and an "x". As can be seen, the brake disc is cast according to FIG. 2 falling from the top box (cope).

FIG. 3 shows a manufacturing process for a brake disc, with the brake-disc mold lying mirror-inverted with respect to the one arranged in FIG. 2. As can be seen, in this case the hub 11 and likewise a friction ring 15 are in the bottom box (drag) 2. The pouring channel connected to the top runner 6 is in this case led through the top box (cope) 1 and terminates in the bottom box (drag) 2 likewise centrally in the area of the bore 13 of the brake disc to be cast. As can bee seen, in this case casting is carried out rising from bottom box (drag) 2.

One of the main advantages in both casting processes is the small differences in hardness of the brake discs manufactured according to this method, on which their high quality is based. For example, the surfaces of the two friction rings 12 and 15 are exactly parallel to each other.

A possible material composition can, for example, consist of a pearlitic basic structure with a maximum of 5% ferrite and a tensile strength of at least 200 N/mm$^2$ with the following chemical composition:

| | |
|---|---|
| Carbon | 3.62–3.68% |
| Silicon | max. 2.10% |
| Manganese | 0.70–0.85% |
| Phosphorus | less than 0.080% |
| Sulphur | less than 0.095% |
| Chromium | 0.18–0.25% |
| Molybdenum | 0.30–0.45% |
| Copper | 0.30–0.45% |
| Remainder | iron |

It goes without saying that the molding of the brake disc can take place in the process according to the invention also using so-called lost or expendable molds. This is a per se well-known process in which the mold is not formed negatively in the sand with the aid of a pattern, but positively in foam material. The foam material then burns away under the influence of the molten iron, which then takes its place.

We claim:

1. A process for casting a ventilated brake disc having a central hub supporting a pair of opposed parallel annular friction surfaces interconnected with one another by a plurality of ventilating ribs, the central hub defining a rotational axis for the ventilated brake disc, said process comprising the steps of:

using a sand mold having a top portion and a bottom portion for the casting;

forming an impression of the ventilated brake disc to be cast in at least one of the top and the bottom portions;

supplying molten material, to form the ventilated brake disc, to the impression within the sand mold substantially along the rotational axis of the ventilated brake disc to be cast, and employing star-shaped riser ribs, extending radially from the rotational axis of the ventilated brake disc to be cast, to facilitate uniformed distribution of the molten material radially outward within the sand mold impression of the ventilated brake disc to be cast whereby the molten material flows substantially radially outward within the impression so that an improved cast ventilated bake disc having a substantially uniformed hardness throughout is produced.

2. A process according to claim 1 further comprising the step of:

casting a plurality of ventilated brake discs in the sand mold via a central top runner having a separate molten material supply branch for each ventilated brake disc casting.

3. A process according to claim 1, further comprising the step of:

molding the ventilated brake disc predominantly in the top portion.

4. A process according to claim 3, further comprising the step of:

supplying the molten material to an uppermost part of the impression such that, during casting, the molten material falls via gravity toward the bottom of the impression thereby filling the impression with molten material.

5. A process according to claim 1, further comprising the step of:

molding the ventilated brake disc predominantly in the bottom portion.

6. A process according to claim 5, further comprising the step of:

supplying the molten material to a lowermost part of the impression such that, during casting, the molten material rises against the force of gravity toward the top of the impression thereby filling the impression with molten material.

7. A process according to claim 1, further comprising the step of using sufficiently heated iron as the molten material and casting the plurality of ventilated brake disc in a single horizontal plane of the sand mold.

* * * * *